(12) United States Patent
Bayless et al.

(10) Patent No.: US 12,066,358 B2
(45) Date of Patent: *Aug. 20, 2024

(54) SYSTEM AND METHOD FOR ALERTING THIRD-PARTIES OF AN UNFAVORABLE CONDITION

(71) Applicant: Independence Materials Group, LLC, Virginia Beach, VA (US)

(72) Inventors: Ben Bayless, Decatur, AL (US); Andy Burran, Chickamauga, GA (US); John Calagaz, Mobile, AL (US); Michael Cox, Soddy Daisy, TN (US)

(73) Assignee: Independence Materials Group, LLC, Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,723

(22) Filed: Apr. 26, 2023

(65) Prior Publication Data

US 2024/0077378 A1 Mar. 7, 2024

Related U.S. Application Data

(63) Continuation of application No. 17/229,638, filed on Apr. 13, 2021, now Pat. No. 11,668,624.

(60) Provisional application No. 63/008,957, filed on Apr. 13, 2020, provisional application No. 63/009,202, filed on Apr. 13, 2020.

(51) Int. Cl.
*G01M 5/00* (2006.01)
*G08B 21/18* (2006.01)
*G08B 21/20* (2006.01)

(52) U.S. Cl.
CPC .......... *G01M 5/005* (2013.01); *G01M 5/0091* (2013.01); *G08B 21/182* (2013.01); *G08B 21/20* (2013.01)

(58) Field of Classification Search
CPC ....... G08B 21/182; G08B 21/20; G01F 23/00; G01M 5/005
See application file for complete search history.

(56) References Cited

U.S. PATENT DOCUMENTS

| | | | |
|---|---|---|---|
| 6,157,307 A | 12/2000 | Hardin | |
| 9,672,717 B1 * | 6/2017 | Slavin | G08B 21/18 |
| 9,709,431 B1 | 7/2017 | Kinney et al. | |
| 9,989,397 B1 | 6/2018 | Kinney et al. | |

(Continued)

FOREIGN PATENT DOCUMENTS

WO 0197497 A2 12/2001

*Primary Examiner* — Adnan Aziz
(74) *Attorney, Agent, or Firm* — Moore & Van Allen PLLC; Jeffrey R. Gray

(57) ABSTRACT

A system and method for monitoring conditions in a crawl space is provided. The system generally comprises at least one sensor, computing device, data aggregator operably connected to the at least one sensor, processor operably connected to the computing device, power supply, and non-transitory computer-readable medium coupled to the processor and having instructions stored thereon. The system is designed to collect condition data via the at least one sensor and determine whether the conditions within the crawl space could have a detrimental impact on the building. In particular, the system is designed to alert a third-party when a condition might cause damage to a building so that the third-party might correct the cause of the condition.

18 Claims, 8 Drawing Sheets

411

| Technicians | + |
|---|---|
| John Smith<br>Johnsmith@123abc.com | 🗑 |
| Jane Smith<br>Janesmith@465def.com | 🗑 |

430A

| Alerts | |
|---|---|
| Water Detected<br>Account: EBG848586 | 11/27/2019, 10:24:09 AM |
| Dry Running Pump<br>Account: HJA678910 | 11/28/2019, 9:23:44 PM |

435B

| Assigned Properties | | | |
|---|---|---|---|
| ⚠ | John Doe<br>1234 River Dr.<br>Mobile, AL | EBG848586 | > |
| ✓ | Jane Doe<br>5678 Lake St.<br>Mobile, AL | HJA678910 | > |

435A

(56) References Cited

U.S. PATENT DOCUMENTS

| | | | |
|---|---|---|---|
| 10,042,341 B1 | 8/2018 | Jacob | |
| 10,481,574 B2 * | 11/2019 | Wiens-Kind | G08B 27/006 |
| 10,497,250 B1 * | 12/2019 | Hayward | G06N 3/088 |
| 11,054,342 B2 | 7/2021 | Courtney et al. | |
| 11,087,420 B1 | 8/2021 | Trundle | |
| 2006/0037392 A1 | 2/2006 | Carkner et al. | |
| 2008/0124175 A1 | 5/2008 | Riste | |
| 2011/0146582 A1 | 6/2011 | Lemmon et al. | |
| 2012/0197555 A1 | 8/2012 | Cheng et al. | |
| 2013/0241727 A1 | 9/2013 | Coulombe | |
| 2014/0197944 A1 | 7/2014 | Felgate et al. | |
| 2015/0100167 A1 | 4/2015 | Sloo et al. | |
| 2017/0297866 A1 | 10/2017 | Fauconnet et al. | |
| 2017/0370369 A1 | 12/2017 | Grzeika | |
| 2019/0120234 A1 | 4/2019 | Correia | |
| 2019/0323507 A1 | 10/2019 | Wilkerson | |
| 2019/0333233 A1 | 10/2019 | Hu et al. | |
| 2020/0018665 A1 | 1/2020 | Ostashev | |
| 2020/0209041 A1 | 7/2020 | Breitenfeldt et al. | |
| 2020/0219375 A1 | 7/2020 | Peros | |
| 2020/0240418 A1 | 7/2020 | Correia | |
| 2020/0387127 A1 * | 12/2020 | McGill | G06V 20/20 |
| 2021/0309539 A1 | 10/2021 | Kutney et al. | |
| 2021/0312789 A1 | 10/2021 | Linn | |
| 2021/0340740 A1 | 11/2021 | Kochan, Jr. | |
| 2021/0366062 A1 | 11/2021 | Trundle | |
| 2022/0136886 A1 | 5/2022 | Dyer | |
| 2022/0318896 A1 * | 10/2022 | Stanovnov | G06Q 10/087 |
| 2022/0366507 A1 | 11/2022 | Linn | |
| 2023/0035517 A1 * | 2/2023 | Bentley, III | G06Q 30/0206 |

* cited by examiner

← 411

| Technicians | | + |
|---|---|---|
| John Smith<br>Johnsmith@123abc.com | | 🗑 |
| Jane Smith<br>Janesmith@465def.com | | 🗑 |

430A encompasses the two technician rows.

| Alerts | |
|---|---|
| Water Detected<br>Account: EBG848586 | 11/27/2019, 10:24:09 AM |
| Dry Running Pump<br>Account: HJA678910 | 11/28/2019, 9:23:44 PM |

435B encompasses the two alert rows.

| Assigned Properties | | | |
|---|---|---|---|
| ⚠ | John Doe<br>1234 River Dr.<br>Mobile, AL | EBG848586 | > |
| ✓ | Jane Doe<br>5678 Lake St.<br>Mobile, AL | HJA678910 | > |

435A encompasses the two assigned properties rows.

FIG. 5

| 435A → | Attic | ⋮ |
|---|---|---|
| 🌡 Temperature | | 78.62°F |
| 💧 Humidity | | 48% RH |

435B encompasses Temperature and Humidity rows.

| 435A → | Crawl Space | ⋮ |
|---|---|---|
| 🌡 Temperature | | 69.83°F |
| 💧 Humidity | | 54% RH |
| Water Sensor (Status) | | Dry |
| ToF (Distance) | | 714 |

435B encompasses the four data rows.

| | Sump Pump | ⋮ |
|---|---|---|
| Toggle | | On |
| Status | | Idle |

435B points to Status row.

411 labels the overall view.

FIG. 6

SYSTEM AND METHOD FOR ALERTING THIRD-PARTIES OF AN UNFAVORABLE CONDITION

CROSS REFERENCES

This application claims the benefit of co-pending U.S. patent application Ser. No. 17/229,638 filed on Apr. 13, 2021, which claims the benefit of U.S. Provisional Application No. 63/008,957 and U.S. Provisional Application No. 63/009,202, both of which were filed on Apr. 13, 2020, wherein each of which are assigned to the assignee hereof and all of the which are herein incorporated by reference.

FIELD OF THE DISCLOSURE

The subject matter of the present disclosure refers generally to a system and method for monitoring conditions within the crawl space of a building and alerting users when an unfavorable condition is detected.

BACKGROUND

A crawl space is the space located underneath the flooring of the house and is considered to be an integral segment of a building. It's primarily aim is to promote air flow throughout the house since the crawlspace is constructed to elevate the building from the ground. However, the crawlspace also protects a building from termite prone locations as well as damp sites. Additionally, the crawl space is where you can find the duct work and plumbing. Therefore, if repairs or additions are needed for a particular building, a crawl space makes it easy and efficient to do it. Unfortunately, many homeowners don't pay attention to their crawling space section even though it is vital for homeowners to maintain its quality.

Because the crawl space helps circulate the air around the building, it is exposed to humidity fluctuations outside of the building. Hence, the relative humidity inside of a building may increase depending on whether the crawl space is properly sealed or not. If the relative humidity inside of a building increases too much, it can be bad for the health of those exposed to the environment since high relative humidity may promote mold growth that can weaken the subfloor structure over time. Furthermore, certain types of toxic molds are known to cause serious health problems to certain individuals when exposed and can be quite costly to remove, requiring specialized equipment and evacuation of the building until remediation is completed. Additionally, high humidity and/or standing water levels within a crawl space may attract certain types of pests that can cause damage to a building foundation or subfloor structure. This means it is very important that owners of buildings monitor the humidity levels and/or standing water levels within the crawl space of a building be kept within acceptable limits at all times.

Therefore, there is a need in the art for a system and method that tracks the conditions in the crawl space of a building in order to prevent costly problems before they occur.

DESCRIPTION

A system and methods for monitoring conditions within an auxiliary building expanse of a building and alerting third parties of an unfavorable condition is provided. In one aspect, the system allows users to determine when an unfavorable condition has developed in an auxiliary building expanse. In another aspect, the system warns a user of the system when an unfavorable condition within an auxiliary building expanse has developed. Generally, the system obtains condition data from various sensors within the auxiliary building expanse and compares that condition data to condition thresholds of the system in order to determine if a particular condition within the auxiliary building expanse is outside of an acceptable range. When the system determines that a condition is outside of an acceptable range, the system may alert a third-party user so that the issue may be addressed before the unfavorable condition worsens. The system may determine unfavorable conditions by comparing condition data to condition thresholds of an auxiliary building expanse. The condition thresholds may be manually input via the user interface or created by the system using condition data received from the at least one sensor.

The system generally comprises at least one sensor, computing device, data aggregator operably connected to the at least one sensor, processor operably connected to the computing device, power supply, and non-transitory computer-readable medium coupled to the processor and having instructions stored thereon. In one embodiment, the computing device may comprise a user interface that may allow a user to view data of the system and/or cause the system to perform an action via commands input by said user. In another embodiment, the system may comprise a database operably connected to the processor, which may be used to store building data and condition data therein. The processor is configured to receive condition data and then use this information to determine when an unfavorable condition has occurred. The computing entity may comprise a user interface that may allow a user to view data of the system and/or cause the system to perform an action via commands input by said user. A database may be used to store condition data and building data gathered by the system. A wireless communication interface may allow the processor to receive audio data in the form of radio waves or as digital data.

The system may also comprise a sump pump connected configured to transmit data to the computing entity. An electrical current sensor may allow the system to determine when the sump pump is pulling an electrical current, which is then relayed to the computing entity. This may allow a user to determine when the sump pump is running, indicating water in the floor area of the auxiliary building expanse. The system may also determine when the sump pump is malfunctioning based on the amount of current pulled from the data aggregator. For instance, a sump pump pumping water will pull more current than a sump pump that is dry running.

The system collects condition data within an auxiliary building expanse and saves it within various profiles so that a third-party user may monitor the conditions within said auxiliary building expanse. In particular, the system is designed to alert a third-party user when conditions within an auxiliary building expanse have gone outside of acceptable norms. User data, building data, and condition data stored in user profiles and building profiles of the system are monitored by third party users to make sure condition data within an particular building expanse of a user does not go outside an acceptable range. The system may also send alerts to third party users, which may allow the system to track conditions within a particular user's auxiliary building expanse and alert third-party users of potential problems within said auxiliary building expanse without the third party user needing to constantly monitor the condition data for each user of the system. The at least one sensor may be secured within the auxiliary building expanse in a way such that it may measure conditions of the auxiliary building expanse and transmit condition data to the processor before being stored within the various profiles.

Users may access data of the system via the user interface, which may cause the non-transitory computer-readable medium and/or database to transmit data back to the processor, wherein the processor may present it to the user via a display. This information may be presented to the user in a way such that the user may quickly determine whether anything is amiss within the auxiliary building expanse. The user interface may also allow a user to control devices of the system. Users may also view third party technicians who may be monitoring the conditions of a particular auxiliary building expanses in addition to any alerts that might be applicable to said auxiliary building expanses. Users may add and remove third parties via the user interface, allowing a user to change third parties if they do not resolve an unfavorable condition to the user's satisfaction. Only users with certain permission levels may add or remove vendors. Auxiliary building expanses and relevant condition data may be separately listed within the user interface to allow a user to immediately see conditions in each auxiliary expanse via the user interface.

The system may be configured to automatically send a third-party user to resolve an unfavorable condition or may allow a user to choose a third party to resolve the unfavorable condition manually via the user interface. Regardless of the method used, a chosen third party will be sent data from the system concerning the user, building, and unfavorable condition. The system may alternatively be configured to allow a monitoring user to view condition data of a passive user's building profile. When the system detects an unfavorable condition within a passive user's auxiliary building expanse, the system may alert a monitoring user, and the monitoring user may then choose a third party to address the unfavorable condition. The monitoring user may choose any vendor within the system to address the unfavorable condition, wherein a vendor is a user of the system who may be contacted by other users of the system to address an unfavorable condition within an auxiliary building expanse. In some embodiments, only vendors approved by the system may be chosen by the monitoring user, wherein the vendors allowed by the system are chosen by the passive user and saved within a passive user's user profile.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

FIG. 5 is an illustration of a user interface embodying features consistent with the principles of the present disclosure.

FIG. 6 is an illustration of a user interface embodying features consistent with the principles of the present disclosure.

DETAILED DESCRIPTION

In this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. As used herein, the term "condition" and grammatical equivalents thereof may be defined as an aspect of the physical environment within an auxiliary building expanse. As used herein, the term "auxiliary building expanse" may be defined as a part of a building that is in addition to the main living area, such as an attic, basement, crawl space, etc.

Figure 1:
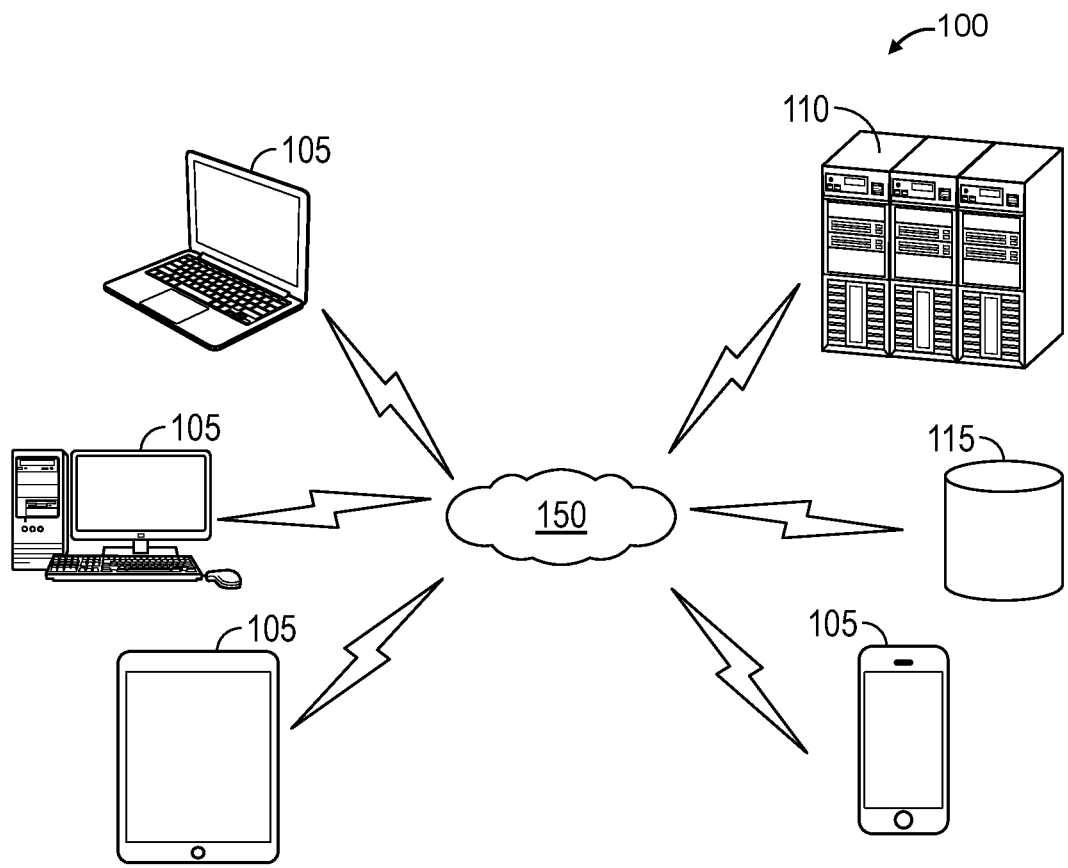
FIG. 1 is a diagram of an example environment in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document.

Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
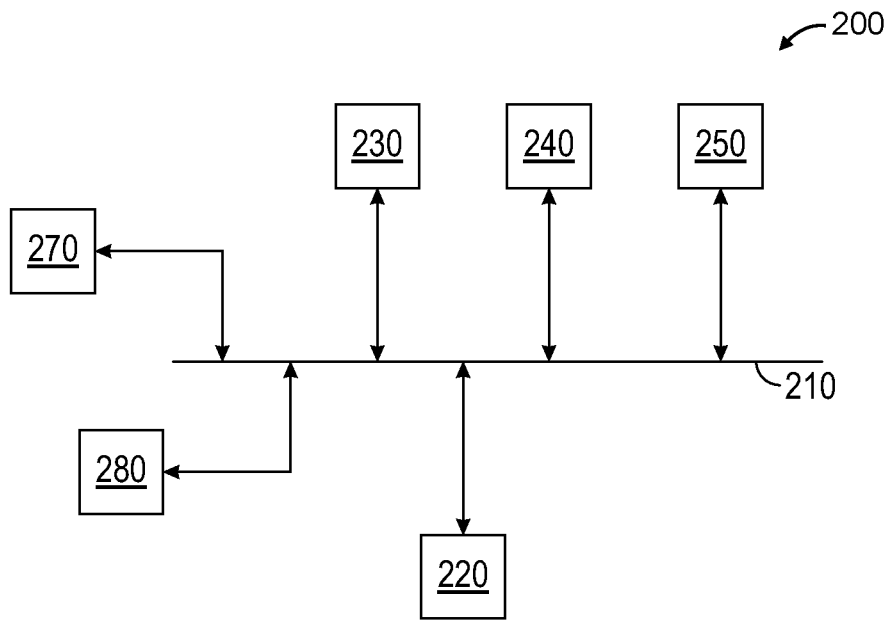
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of processor or microprocessor suitable for interpreting and executing computer readable instructions. The processor 220 is configured to perform the operations disclosed herein based on instructions stored within the system 400. The processor 220 may process instructions for execution within computing device 350, including instructions stored in memory or on a storage device, to display graphical information for a graphical user interface 411 (GUI) on an external input/output device, such as a display 316. The processor 220 may provide for coordination of the other components of a computing device 350, such as control of user interfaces 411, applications run by a computing device 350, and wireless communication by a communication device of the computing device 350. In some embodiments, the processor 220 may have a memory device therein or coupled thereto suitable for storing condition data 430B, building data 430A, or other information or material disclosed herein. In some instances, the processor 220 may be a component of a larger computing device 350. A computing device 350 that may house the processor 220 therein may include, but are not limited to, laptops, desktops, workstations, personal digital assistants, servers 110, databases 115, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers 110, databases 115, mainframes, cellular telephones, tablet computers, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device 408 and/or an output device 408. As used herein, an input device 408 may be defined as a device that allows a user 405 to input data and instructions that is then converted into a pattern of electrical signals in binary code that are comprehensible to a computing entity 200. An input device 408 of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device 408 may be defined as a device that translates the electronic signals received from a computing entity 200 into a form intelligible to the user 405. An output device 408 of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a smart watch may transfer data to a smartphone, wherein the smartphone may use that data in a manner separate from the smart watch.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
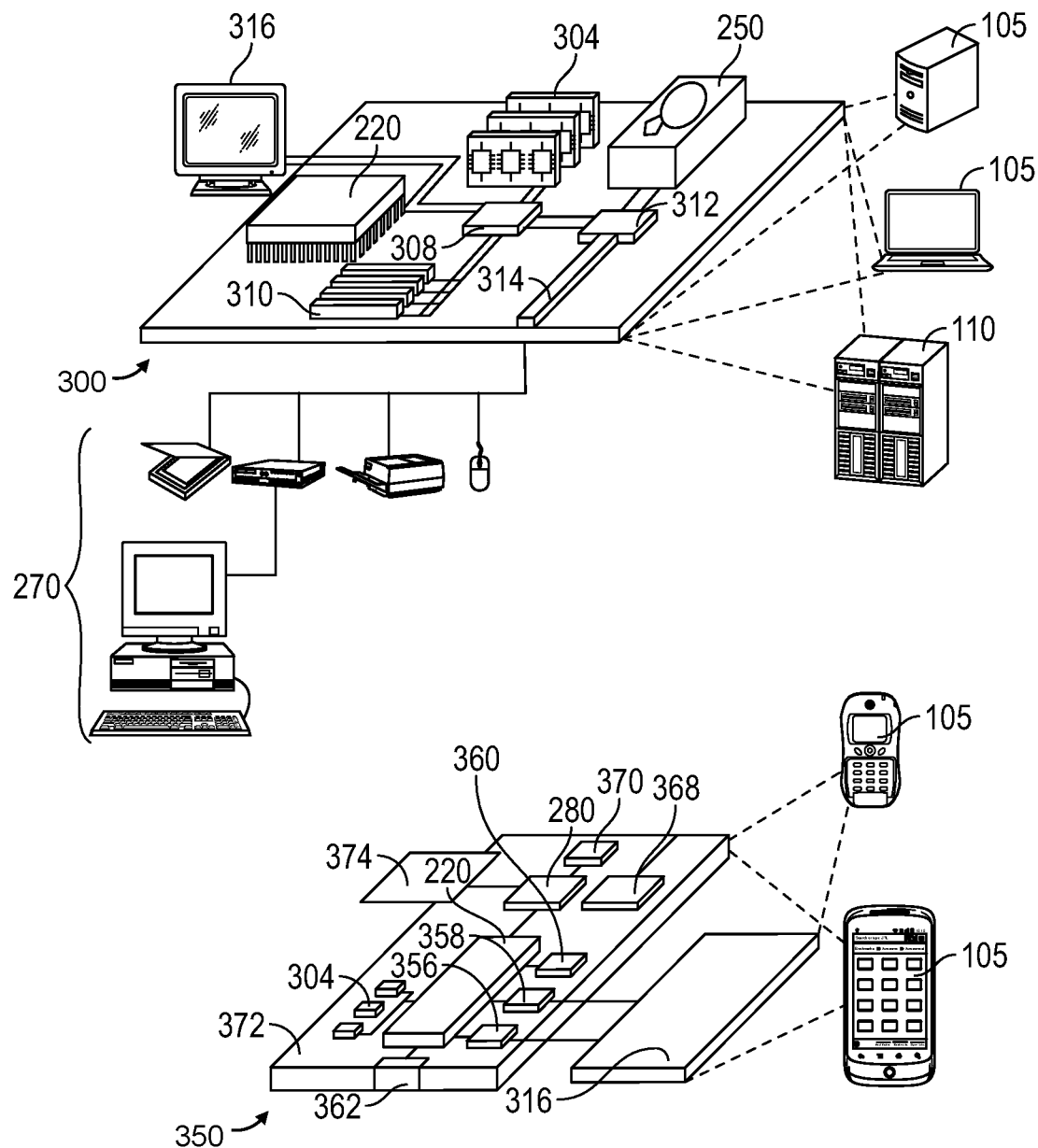
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device 408, such as a display 316 coupled to the high-speed interface 308. In other implementations, multiple processors and/or multiple buses may be used, as appropriate, along with multiple memory units and/or multiple types of memory. Additionally, multiple computing devices 300 may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MIMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may comprise a power supply 520. The power supply 520 may be any source of power that provides the system 400 with electricity. In one preferred embodiment, the system 400 may comprise a plurality of power supplies 520 that may provide power to the system 400 in different circumstances. For instance, the system 400 may be directly plugged into a stationary power outlet, which may provide power to the system 400 so long as it remains in one place. However, the system 400 may also be connected to a battery so that the system 400 may receive power even when it is not connected to a stationary power outlet. In this way, the system 400 may always receive power so that it may continuously update condition data 430B and provide users 405 with continuously updated conditions of the auxiliary building expanse.

Figure 4:
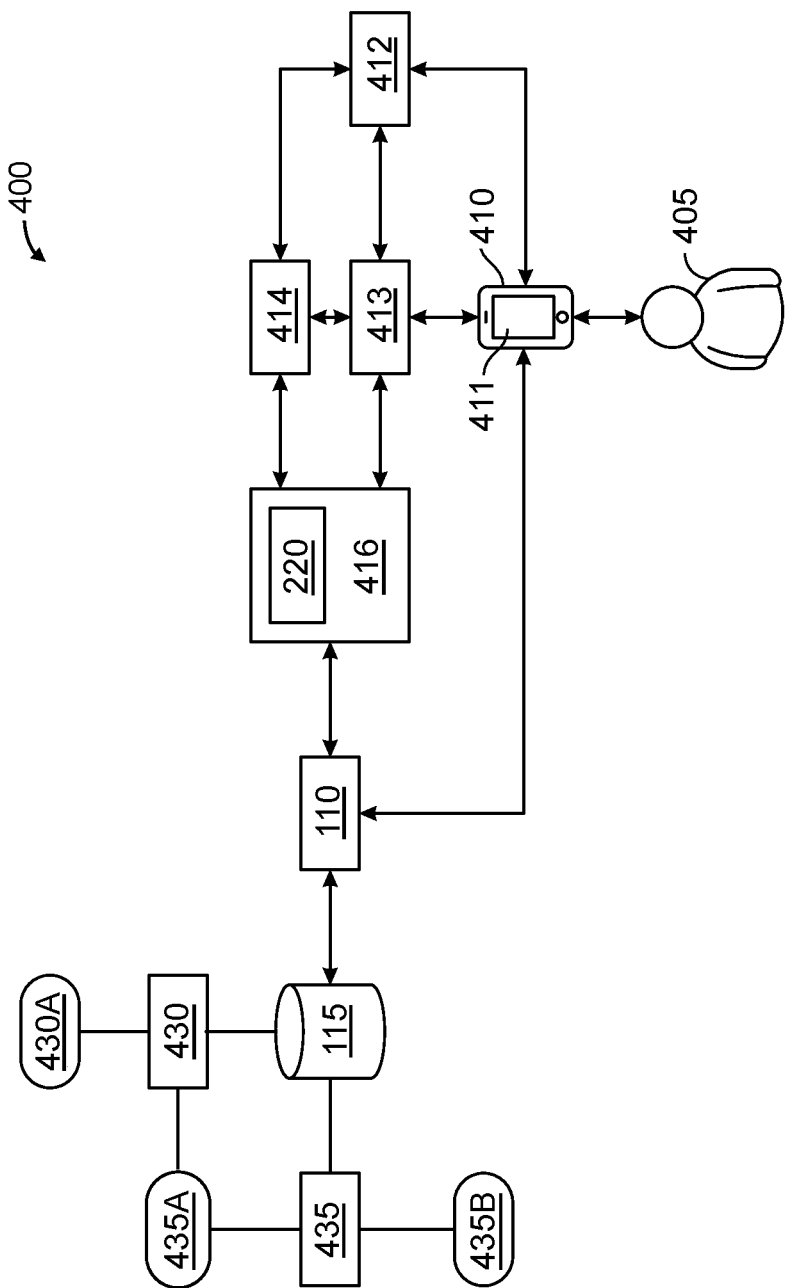
FIG. 4 is an illustration of a system embodying features consistent with the principles of the present disclosure.
Figure 7:
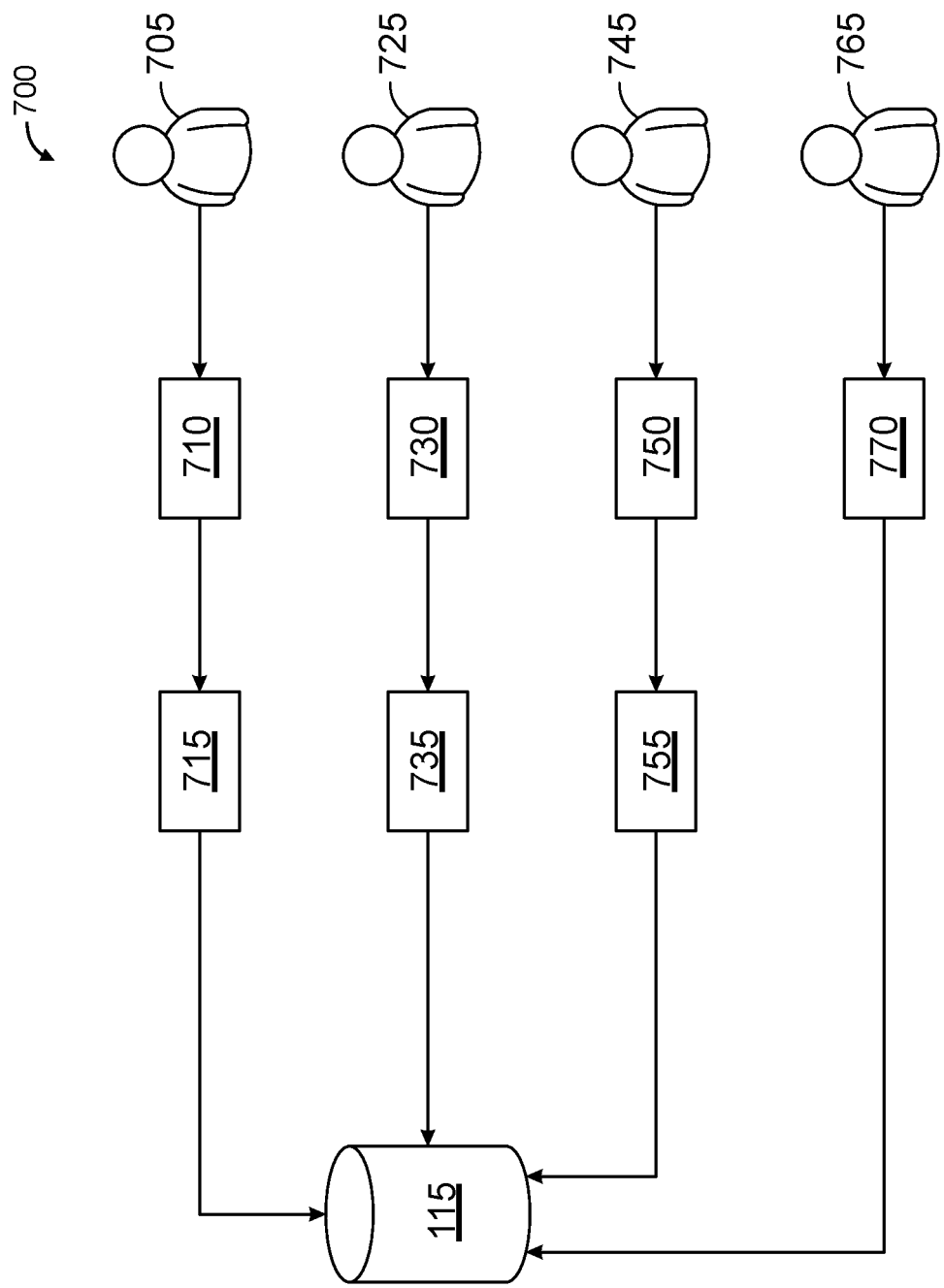
FIG. 7 is an illustration of the manner in which individual access to data may be granted or limited based on permission levels.
Figure 8:
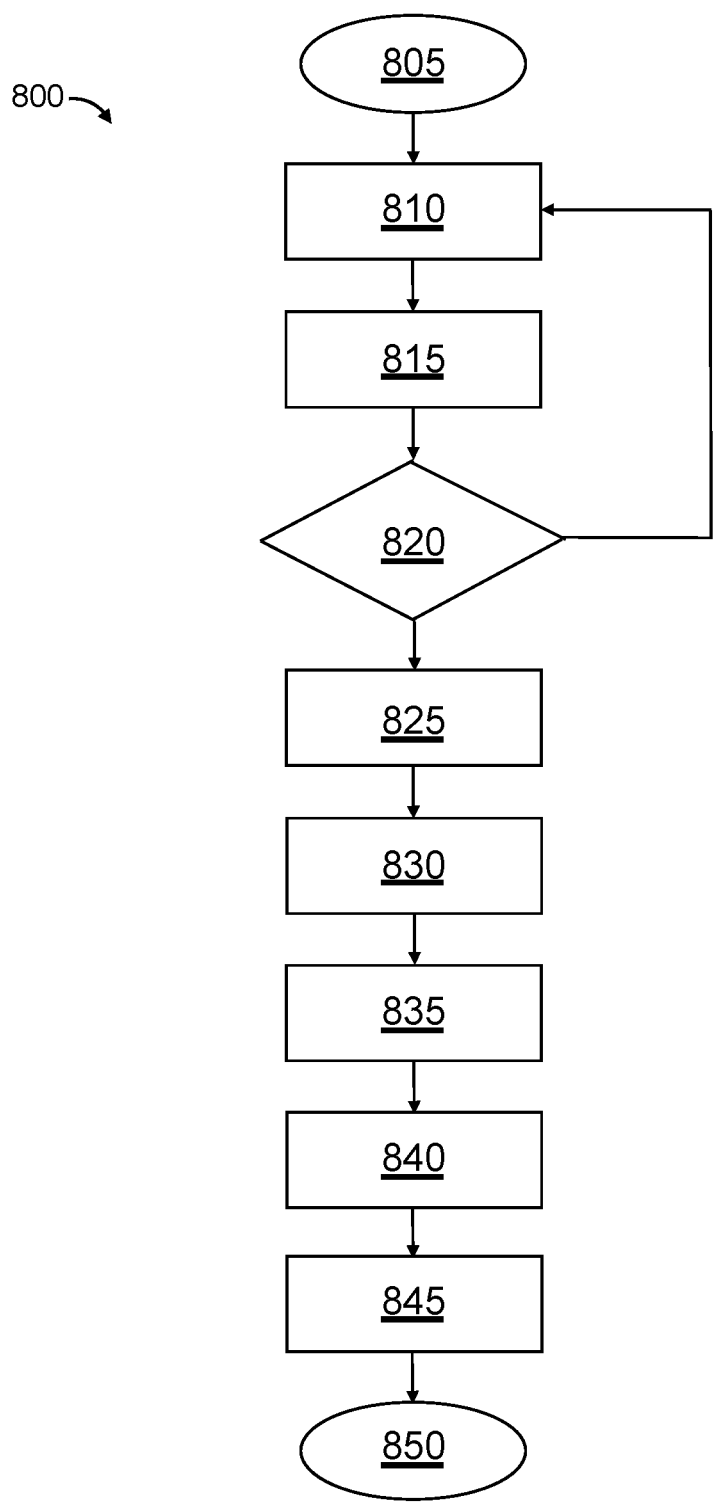
FIG. 8 is a flow chart illustrating certain method steps of a method embodying features consistent with the principles of the present disclosure.
Figure 9:
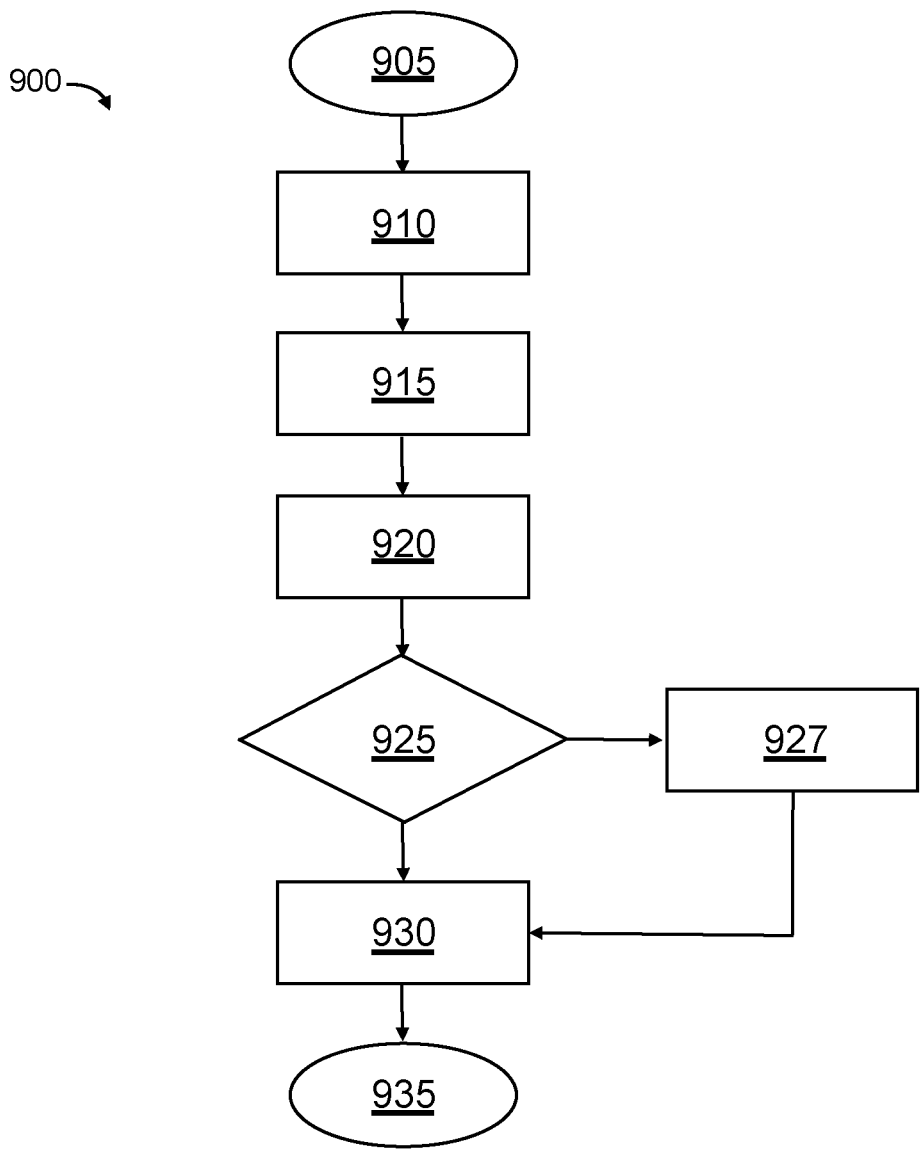
FIG. 9 is a flow chart illustrating certain method steps of a method embodying features consistent with the principles of the present disclosure.

FIGS. 4-9 illustrate embodiments of a system 400 for monitoring conditions within an auxiliary building expanse and alerting third parties of unfavorable conditions. FIG. 4 depicts a preferred embodiment of a system 400 designed to collect condition data 435B. FIGS. 5 and 6 illustrate a preferred embodiment of user interface 411 of the system 400. FIG. 7 illustrates permission levels 700 that may be utilized by the present system 400 for controlling access to building data 435A and condition data 435B. FIGS. 8 and 9 illustrate various methods that may be carried out by the system 400. It is understood that the various method steps associated with the methods of the present disclosure may be carried out as operations by the system 400 depicted in FIG. 4.

Data within the system 400 may be stored in various profiles. In a preferred embodiment, the system 400 comprises user data 430A, building data 435A, and condition data 435B that may be stored in user profiles 430 and building profiles 435. User data 430A may be defined as data that may be used to identify a particular user 405 of the system 400. Building data 435A may be defined as data that may be used to identify a particular building associated with a user profile 430. Condition data 435B may be defined as data that may be used to determine the conditions within an auxiliary building expanse. This may allow the system 400 to track conditions within a particular user's 405 auxiliary building expanse and alert third-party users 405 of potential problems within said auxiliary building expanse.

As illustrated in FIG. 4, the system 400 may comprise a database 115 operably connected to the processor 220. The database 115 may be operably connected to the processor 220 via wired or wireless connection. In a preferred embodiment, the database 115 is configured to store user data 430A, building data 435A, and condition data 435B therein. Alternatively, the user data 430A, building data 435A, and condition data 435B may be stored on the non-transitory computer-readable medium 416. The database 115 may be a relational database such that the user data 430A, building data 435A, and condition data 435B associated with each user profile 430 and building profile 435 within the plurality of user profiles 430 and building profiles 435 may be stored, at least in part, in one or more tables. Alternatively, the database 115 may be an object database such that user data 430A, building data 435A, and condition data 435B associated with each user profile 430 and building profile 435 within the plurality of user profiles 430 and building profiles 435 may be stored, at least in part, as objects. In some instances, the database 115 may comprise a relational and/or object database and a server 110 dedicated solely to managing the user data 430A, building data 435A, and condition data 435B in the manners disclosed herein. Condition data 435B may include, but is not limited to, temperature, humidity level, water level, sump pump run time, settling change, or any combination thereof. Building data 435A may include, but is not limited to, geolocation data, building name, building address, auxiliary building expanse descriptions, or any combination thereof. User data 430A may include, but is not limited to, name, date of birth, address, geolocation, or any combination thereof A user profile 430 may be defined as a profile containing data about a particular user 405. The system 400 may separate user profiles 430 into groups and subgroups. In a preferred embodiment, various groups and subgroups of the system 400 may grant permissions that give users 405 access to data within the system 400. For instance, the user profile 430 of a vendor user 405 may be granted permissions that allow access to condition data 435B relevant to the type of work said vendor user 405 performs. Therefore, a plumber may be granted access to water level data whereas an exterminator may be granted access to movement data. For instance, a third-party monitoring a home for a homeowner may be granted access to all condition data 435B of the system 400 so that they may send for a vendor user 405 when a particular auxiliary building expanse has an unfavorable condition. In one preferred embodiment, the system 400 may store both user data 430A and building data 435A in user profiles 430, which may allow the system 400 to associate a particular user 405 with a particular auxiliary building expanse.

A building profile 435 may be defined as a profile containing data about a particular auxiliary building expanse. In a preferred embodiment, a building profile 435 may comprise of one or more building profiles 435, wherein each building profile 435 within the plurality of building profiles 435 may represent at least one auxiliary building expanse that may be associated with a particular user profile 430. For instance, a user 405 owning a primary home and a vacation home may have a single building profile 435 that details the conditions within the auxiliary building expanses of both homes. For instance, a user 405 owning a primary home and a vacation home may have two building profiles 435 that separately detail the conditions within the auxiliary building expanses of each home. For instance, a user 405 owning a primary home and a vacation home may have multiple building profiles 435 that details the conditions within each auxiliary building separately. In one preferred embodiment, the system 400 may place building profiles 435 into groups and subgroups, which may assign different thresholds that may be used by the system 400 to determine an unfavorable condition in an auxiliary building expanse. For instance, building profiles 435 grouped in the "attic" group may have higher and lower temperature thresholds than building profiles 435 placed in the "garage" group. For instance, the relative humidity threshold may be higher for building profiles 435 in the "crawl space" group than building profiles 435 placed in the "attic" group. In one preferred embodiment, building profiles 435 may store building data 435A and user data 430A, which may allow the system 400 to track which users 405 are associated with which buildings.

As illustrated in FIG. 4, the system 400 generally comprises at least one sensor 412, computing device 410, data aggregator 413 operably connected to the at least one sensor 412, processor 220 operably connected to the computing device 410, power supply, and non-transitory computer-readable medium 416 coupled to the processor 220 and having instructions stored thereon. In one embodiment, the computing device 410 may comprise a user interface 411 that may allow a user 405 to view data of the system 400 and/or cause the system 400 to perform an action via commands input by said user 405. In another embodiment, the system 400 may comprise a database 115 operably connected to the processor 220, which may be used to store building data 435A and condition data 435B therein. In yet another preferred embodiment, a server 110 may be operably connected to the database 115 and processor 220, facilitating the transfer of information between the processor 220 and database 115. The system 400 preferably collects condition data 435B within an auxiliary building expanse and saves it within building profiles 435 so that a third-party user 405 may monitor the conditions within said auxiliary building expanse. In particular, the system 400 is designed to alert a third-party user 405 when conditions within an auxiliary building expanse have gone outside of acceptable norms.

The at least one sensor 412 may be secured within the auxiliary building expanse in a way such that it may measure conditions of the auxiliary building expanse and transmit condition data 435B to the processor 220. Alternatively, the system 400 may receive data from an at least one sensor 412 connected to the data aggregator 413 or the computing device 410. The processor 220 may be operably connected to the data aggregator 413 and/or the computing device 410 in a way such that information may be transmitted to the processor 220 from the at least one sensor 412 connected to the data aggregator 413 or the computing device 410. The processor 220 may then use this information to perform the various functions of the system 400. For instance, a computing device 410 operably connected to the processor 220 may allow the processor 220 to receive data from the computing device 410, process said data, and assign indicia to various indicators within a user interface 411 of the computing device 410 in order to alert a third-party user 405 of an unfavorable condition within an auxiliary building expanse. Types of condition that may be measured by the system 400, include, but are not limited to, temperature, humidity level, parts per million of a particular gas, sound, vibrations, movement, settling, standing water levels, or any combination thereof. Types of sensors that may be used as an at least one sensor 412 include, but are not limited to, thermometer, hygrometer, gas detector, microphone, vibration sensor, current sensor, ultrasonic sensor, infrared sensor, microwave sensor, photoelectric sensor, time-of-flight sensor, or any combination thereof The data aggregator 413 may be operably connected to the processor 220 and/or at least one sensor 412 via wired or wireless connection. In one preferred embodiment, data may be transmitted wirelessly between an at least one sensor 412 and the data aggregator 413 while a wired connection is used to transfer data between the data aggregator 413 and processor 220. In another preferred embodiment, at least one communication bus 414 may facilitate the transfer of data between the at least one sensor 412 and data aggregator 413 and/or the at least one sensor 412 and processor 220. An at least one bus splitter may be used to connect multiple at least one sensors 412 to a single commination bus. In a preferred embodiment, multiple bus splitters may be daisy chained together to create a bus network, which may transmit data received from the at least one sensors 412 connected to the bus network to the data aggregator 413. For instance, a plurality of bus splitters may split the fiber optic cable of a communication bus 414 in a way such that a current sensor operably connected to a sump pump, float switch, microwave motion sensor, and direct time-of-flight sensor may all be connected to a single communication bus 414, which may transmit all of the data to the data aggregator 413.

A sump pump connected to the data aggregator 413 may allow a third-party user 405 to monitor the amount of water within an auxiliary building expanse. In a preferred embodiment, an electrical current sensor of the data aggregator 413 may allow the system 400 to determine when the sump pump pulls power from the data aggregator 413, which is then relayed to the computing device 410. This may allow a user 405 to determine when the sump pump is on. The system 400 may also determine when the sump pump is malfunctioning based on the amount of current pulled from the data aggregator 413. For instance, a sump pump pumping water will pull more current than a sump pump that is dry running. In another embodiment, the sump pump contains a water level sensor or float switch that allows system 400 to determine the amount of standing water within an auxiliary building expanse. This water level data may then be transmitted to the processor 220 and/or computing device 410. As the water level changes, the system 400 may determine how much water the sump pump has removed from the auxiliary building expanse over time.

In an embodiment, the system 400 may further comprise a computing device 410 operably connected to the processor 220. A computing device 410 may be implemented in a number of different forms, including, but not limited to, servers 110, multipurpose computers, mobile computers, etc. For instance, a computing device 410 may be implemented in a multipurpose computer that acts as a personal computer for a user 405, such as a laptop computer. For instance, components from a computing device 410 may be combined in a way such that a mobile computing device 410 is created, such as mobile phone. Additionally, a computing device 410 may be made up of a single computer or multiple computers working together over a network. For instance, a computing device 410 may be implemented as a single server 110 or as a group of servers 110 working together over and Local Area Network (LAN), such as a rack server 110 system 400. Computing devices 410 may communicate via a wired or wireless connection. For instance, wireless communication may occur using a Bluetooth, Wi-Fi, or other such wireless communication device.

In an embodiment, the system 400 may further comprise a user interface 411. A user interface 411 may be defined as a space where interactions between a user 405 and the system 400 may take place. In a preferred embodiment, the interactions may take place in a way such that a user 405 may control the operations of the system 400, and more specifically, allow a user 405 to monitor the conditions of an auxiliary building expanse. A user 405 may input instructions to control operations of the system 400 manually using an input device. For instance, a user 405 may choose to alter the conditions in which the sump pump is activated by using an input device of the system 400, including, but not limited to, a keyboard, mouse, or touchscreen. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the user interface 411 to the user 405 via a display 316 operably connected to the processor 220.

A display 316 may be defined as an output device that communicates data that may include, but is not limited to, visual, auditory, cutaneous, kinesthetic, olfactory, and gustatory, or any combination thereof. Information presented via a display 316 may be referred to as a soft copy of the information because the information exists electronically and is presented for a temporary period of time. Information stored on the non-transitory computer-readable medium 416 may be referred to as the hard copy of the information. For instance, a display 316 may present a soft copy of a visual representation of condition data 435B within an auxiliary building expanse via a liquid crystal display (LCD), wherein the hard copy of the visual representation of condition data 435B within an auxiliary building expanse may be stored on a local hard drive. For instance, a display 316 may present a soft copy of audio information via a speaker, wherein the hard copy of the audio information is stored on a flash drive. For instance, a display 316 may present a soft copy of condition data 435B within an auxiliary building expanse, wherein the hard copy of the condition data 435B within an auxiliary building expanse is stored within a database 115. Displays 316 may include, but are not limited to, cathode ray tube monitors, LCD monitors, light emitting diode (LED) monitors, gas plasma monitors, screen readers, speech synthesizers, haptic suits, speakers, and scent generating devices, or any combination thereof, but is not limited to these devices.

In an embodiment, the programming instructions responsible for the operations carried out by the processor 220 are stored on a non-transitory computer-readable medium 416 ("CRM"), which may be coupled to the server 110, as illustrated in FIG. 4. Alternatively, the programming instructions may be stored or included within the processor 220. Examples of non-transitory computer-readable mediums 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 416.

In a preferred embodiment, users 405 may access data of the system 400 via the user interface 411, which may be accomplished by causing the processor 220 to query the non-transitory computer-readable medium 416 and/or database 115. The non-transitory computer-readable medium 416 and/or database 115 may then transmit data back to the processor 220, wherein the processor 220 may present it to the user 405 via a display 316. This information may be presented to the user 405 in a way such that the user 405 may quickly determine whether anything is amiss within the auxiliary building expanse. The user interface 411 may also allow a user 405 to control devices of the system 400. For instance, a user 405 may turn off a sump pump operably connected to the system 400 via the user interface 411. For instance, a user 405 may change the temperature setting of a thermostat operably connected to the system 400 via the user interface 411.

As illustrated in FIGS. 5 and 6, users 405 may be presented condition data 435B via the user interface 411. In a preferred embodiment, a user 405 may view technicians who may be monitoring the conditions of a particular auxiliary building expanses as well as any alerts that might be applicable to said auxiliary building expanses as illustrated in FIG. 5. For instance, a user 405 may view which vendors may be called to resolve an unfavorable condition detected by the system 400. In a preferred embodiment, users 405 may add and remove vendors via the user interface 411. For instance, if a vendor fails to timely or adequately resolve an unfavorable condition to the user's 405 satisfaction, the user 405 may remove the vendor from the list of preferred vendors via the user interface 411. They may then add a new vendor from the system 400 to their list of preferred vendors should the system 400 detect an unfavorable condition in the future. In another preferred embodiment, only users 405 with certain permission levels 700 may add or remove vendors. For instance, an administrator may only allow vendors who have been vetted to be in the system 400. The administrator may then assign vendors to auxiliary building expanses when the system 400 detects an unfavorable condition. In another preferred embodiment, regular users 405 may assign a preference to vendors within the system 400, so if a particular vendor is unavailable to resolve a detected unfavorable condition, the system 400 may attempt to contact the next preferred vendor to resolve the problem until a vendor is confirmed.

In another preferred embodiment, users 405 may access condition data 435B in a way as illustrated in FIG. 6. In one preferred embodiment, the auxiliary building expanses and relevant condition data 435B may be separately listed within the user interface 411 to allow a user 405 to immediately see conditions in each auxiliary expanse via the user interface 411. For instance, an auxiliary building expanse in the form of an attic may be listed separately from an auxiliary building expanse in the form of a crawl space. In one preferred embodiment, a user 405 may be prompted to select a building containing auxiliary building expanses being monitored by the system 400, and the system 400 may then indicate only if there are any potential problems within any of the auxiliary building expanses of that building. For instance, a user 405 having a primary residence in Mobile, AL and a secondary residence on Dauphin Island, AL may select their secondary residence via the user interface 411 to see if an unfavorable condition has resulted from recent inclement weather has resulted in flooding of the crawl space or leaking to the roof In a preferred embodiment, the system 400 may alert a user 405 of the unfavorable condition within an auxiliary building expanse. The user 405 may then determine whether a vendor user 405 should be sent to address the issue. A vendor user 405 may be defined as a user 405 of the system 400 that may be contacted by other users 405 of the system 400 to address an unfavorable condition within an auxiliary building expanse. For instance, the system 400 may alert a user 405 of an unfavorable condition involving the sump pump, and the system 400 may allow the user 405 to contact a vendor user 405 to fix whatever is causing the unfavorable condition. In a preferred embodiment, a user 405 may manually select a vendor user 405 via the user interface 411 of the system 400. Alternatively, the system 400 may automatically choose a vendor user 405 to address an unfavorable condition without the input of the user 405. In yet another preferred embodiment, the system 400 may provide the user 405 with a list of vendor users 405 to choose from. In yet another embodiment, the system 400 may select a vendor user 405 from a list of vendor users 405 chosen by the user 405. Once a vendor user 405 has been selected, the vendor user 405 will be sent building data 435A and condition data 435B, which may allow the vendor user 405 to assess the situation within the auxiliary building expanse prior to arrival.

In one preferred embodiment, the system 400 may allow a monitoring user 405 to view condition data 435B of a passive user's 405 building profile 435. A monitoring user 405 may be defined as a user 405 having appropriate permissions to view building profiles 435 associated with a passive user's 405 user profile 430 such that they may monitor the conditions within the passive user's 405 auxiliary building expanses for said passive user 405. A passive user 405 may be defined as a user 405 that allows a monitoring user 405 to monitor condition data 435B within their auxiliary building expanses. When the system 400 detects an unfavorable condition within a passive user's 405 auxiliary building expanse, the system 400 may alert a monitoring user 405, and the monitoring user 405 may then choose a vendor user 405 to address the unfavorable condition. In one preferred embodiment, the monitoring user 405 may choose any vendor user 405 within the system 400 to address the unfavorable condition. In another preferred embodiment, the monitoring user 405 may be required by the system 400 to choose from a list of vendor users 405 selected by the user 405, which may be saved within a passive user's 405 user profile 430. In yet another preferred embodiment, the monitoring user 405 may provide the passive user 405 with a list of vendor users 405 that may be used to address the unfavorable condition. In embodiments were a vendor is chosen by the monitoring user 405, the system 400 may alert a passive user 405 of the vendor user's 405 selection and allow a passive user 405 to accept or decline the use of the chosen vendor user 405.

Once condition data 435B has been measured and transmitted to the processor 220, the condition data 435B may be saved by the system 400. In a preferred embodiment, condition data 435B is saved within a building profile 435, which may be viewed within the user interface 411 of the system 400, as illustrated in FIGS. 5 and 6. Once saved, the system 400 may compare the condition data 435B to condition thresholds of the system 400. A condition threshold may be defined as the maximum/minimum value a particular category of condition data 435B may exist before triggering a warning within the system 400. In a preferred embodiment, condition thresholds are stored within building profiles 435. Condition thresholds may be automatically generated by the system 400 or input by a user 405 via the user interface 411. For instance, the system 400 may be configured to automatically set a condition threshold for humidity at a maximum value of 65% relative humidity. If the system 400 determines that the relative humidity of the auxiliary building expanse is higher than 65%, the system 400 may alert the user 405 that the conditions within the auxiliary building expanse may be conducive for mold growth. For instance, a user 405 may set a condition threshold for temperature to a minimum value of 32 degrees Fahrenheit via a user interface 411 of the computing device 410. If the system 400 determines that the temperature within the auxiliary building expanse is lower than 32 degrees, the system 400 may alert the user 405 that the conditions within the auxiliary building expanse may be conducive for frozen pipes.

In one preferred embodiment, the system 400 may create custom condition thresholds for an auxiliary building expanse using condition data 435B received from the at least one sensors 412. For instance, a time of flight sensor may determine that it is located approximately three feet from a reflective plate, which the system 400 may then use as a condition threshold to monitor settling of a building over time. For instance, a hygrometer may measure the relative humidity within an auxiliary building expanse over several weeks to determine the mean relative humidity, as well as the R-value for that particular data set, which the system 400 may then use to monitor conditions within the auxiliary building expanse. So long as the relative humidity does not fall outside of two standard deviations of the mean relative humidity, the system 400 may not alert a user 405 of an unfavorable condition.

To prevent un-authorized users 405 from accessing all data within the building profiles 435 of the system 400, the system 400 may employ a security method. As illustrated in FIG. 7, the security method of the system 400 may comprise a plurality of permission levels 700 that may allow a user 405 to view content 715, 735, 755 within the database 115 while simultaneously denying users 405 without appropriate permission levels 700 the ability to view said content 715, 735, 755. To access the data stored within the database 115, users 405 may be required to make a request via a user interface 411. Access to the data within the database 115 may be granted or denied by the processor 220 based on verification of a requesting user's 705, 725, 745 permission level 700. If the requesting user's 705, 725, 745 permission level 700 is sufficient, the processor 220 may provide the requesting user 705, 725, 745 access to content 715, 735, 755 stored within the system 400. Conversely, if the requesting user's 705, 725, 745 permission level 700 is insufficient, the processor 220 may deny the requesting user 705, 725, 745 access to content 715, 735, 755 stored within the system 400. In an embodiment, permission levels 700 may be based on user roles 710, 730, 750 and administrator roles 770, as illustrated in FIG. 7. User roles 710, 730, 750 allow users 405 to access content 715, 735, 755 that a user 405 has uploaded and/or otherwise obtained through use of the system 400. Administrator roles 770 allow administrators 765 to access system 400 wide data.

In an embodiment, user roles 710, 730, 750 may be assigned to a user 405 in a way such that a requesting user 705, 725, 745 may access user profiles 430 and building profiles 435 via a user interface 411. To access the data within the database 115, a user 405 may make a user 405 request via the user interface 411 to the processor 220. In an embodiment, the processor 220 may grant or deny the request based on the permission level 700 associated with the requesting user 705, 725, 745. Only users 405 having appropriate user roles 710, 730, 750 or administrator roles 770 may access the content 715, 735, 755. For instance, as illustrated in FIG. 7, requesting user 1 705 has permission to view user 1 content 715 whereas requesting user 2 has permission to view user 1 content 715, user 2 content 735, and user 3 content 755. Alternatively, content 715, 735, 755 may be restricted in a way such that a user 405 may only view a limited amount of content 715, 735, 755. For instance, requesting user 3 745 may be granted a permission level 700 that only allows them to view user 3 content 755 related to a particular condition of the building. Therefore, the permission levels 700 of the system 400 may be assigned to users 405 in various ways without departing from the inventive subject matter described herein.

FIG. 8 provides a flow chart illustrating certain, preferred method steps that may be used to carry out the method for alerting a user 405 that an action should be taken within the auxiliary building expanse. Step 805 indicates the beginning of the method. During step 810, the processor 220 may receive condition data 435B from the at least one sensor 412 of the system 400. The system 400 may then perform a query to determine whether a condition threshold has been violated by the condition data 435B during step 815. Based on the results of the query, the system 400 may perform an action during step 820. If the system 400 determines that a condition threshold has not been violated, the processor 220 may return to step 810 and continue monitoring the auxiliary building expanse. If the system 400 determines that a condition threshold has been violated, the processor 220 may send an alert to a third-party user 405 during step 825.

Once the third-party user 405 has been alerted, the third-party user 405 may use the system 400 to send an alert to a vendor user 405 during step 830. The system 400 may send system 400 data to the vendor user 405 during step 835. Depending on the permissions of vendor user 405, the system 400 may send different data. In a preferred embodiment, the system 400 only sends user data 430A, building data 435A, and condition data 435B to the vendor user 405 needed to resolve the unfavorable condition. Once a vendor user 405 has fixed whatever was causing the unfavorable condition, the vendor user 405 may tell the system 400 that they have completed their assigned task during step 840. The system 400 may then alert the third-party user 405 that the vendor user 405 has completed their assigned task during step 845. Once the third-party user 405 has been notified that the vendor user 405 has completed their task, the system 400 may proceed to the terminate method step 850.

In one preferred embodiment, the system 400 may also include a step that allows a passive user 405 to choose a vendor user 405 to resolve the unfavorable condition. For instance, once the third-party user 405 has chosen a vendor user 405 to resolve the unfavorable condition during step 830, the system 400 may alert the passive user 405 of which vendor user 405 has been chosen by the third-party user 405 and allow the passive user 405 to confirm or deny the selection. Should the passive user 405 confirm the selection of the vendor user 405, the method may proceed to step 835. Should the passive user 405 deny the selection of the vendor user 405, the system 400 may proceed to step 830 and force the third-party user 405 to choose a new vendor user 405 to address the unfavorable condition. In another preferred embodiment, the system 400 may provide the third-party user 405 with a list of vendor users 405 to choose from prior to step 830, wherein the list contains a plurality of pre-approved vendor users 405 chosen by the passive user 405.

FIG. 9 provides a flow chart illustrating certain, preferred method steps that may be used to carry out the method of measuring conditions within an auxiliary building expanse and creating custom condition thresholds. Step 905 indicates the beginning of the method. During step 910, the processor 220 may receive condition data 435B from the at least one sensors 412 of the system 400. Once the condition data 435B has been received, the system 400 may store the condition data 435B within a building profile 435 of the system 400 during step 915. The system 400 may then perform an analysis on the condition data 435B during step 920 to create custom condition thresholds for a condition. In one preferred embodiment, the system 400 may set the lowest values a highest values of the data for a particular condition as the condition thresholds for the system 400. In another preferred embodiment, the system 400 may determine the mean value of a condition and take the square of the population variance to determine the high and low values for a condition.

Once the system 400 has created custom condition thresholds for a condition, the system 400 may ask a user 405 to confirm or deny the custom condition thresholds as the condition thresholds for an auxiliary building expanse during step 925. If the user 405 confirms, the system 400 may save the condition thresholds during step 930 and subsequently proceed to terminate method step 935. If the user 405 denies, the system 400 may ask the user 405 to input condition thresholds during step 927. Alternatively, the system 400 may set predefined condition threshold values as the condition thresholds of the system 400. Once the user 405 inputs the condition thresholds, the system 400 may save the condition thresholds during step 930. The system 400 may then proceed to terminate method step 935.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device 316, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for alerting parties of unfavorable conditions, the system comprising:
   one or more processors;
   one or more non-transitory computer-readable mediums operatively coupled to the one or more processors and having instructions stored thereon, which when executed cause the one or more processors to:
   receive condition data captured by one or more sensors for a plurality of buildings;
   store the condition data from the one or more sensors for the plurality of buildings in one or more profiles, wherein the one or more profiles comprise:
   a plurality of user profiles; and
   a plurality of building profiles;
   wherein one or more of the plurality of user profiles are linked to one or more of the plurality of building profiles; and
   wherein the condition data for the one or more sensors is stored within a respective building profile for the plurality of buildings;
   access condition thresholds from the one or more profiles for the plurality of buildings;
   compare the condition data to the condition thresholds;
   identify that the condition data violates at least one of the condition thresholds; and
   send an alert of an unfavorable condition in a building to a user on a user computer device in response to identifying that the condition data for a sensor for the building violates the at least one of the condition thresholds, wherein the user is determined from a user profile linked to a building profile for the building.

2. The system of claim 1, wherein the plurality of user profiles, the plurality of building profiles, the condition data, and the condition thresholds are stored in a database, and wherein the database is a relational database or an object database.

3. The system of claim 1, wherein when the instructions are executed the one or more processors are further configured to:
   receive a selection of the at least one of the condition thresholds from the user through a user interface.

4. The system of claim 1, wherein the condition thresholds are customized condition thresholds, and wherein when the instructions are executed the one or more processors are further configured to:
   capture the condition data multiple times between a first time and a second time;
   determine a customized condition threshold based on an analysis of the condition data captured multiple times between the first time and the second time.

5. The system of claim 1, wherein when the instructions are executed the one or more processors are further configured to:
   send an alert of the unfavorable condition and the condition data to a vendor responsible for assessing the building.

6. The system of claim 1, wherein the user is a passive user for the building.

7. The system of claim 1, wherein the user is a monitoring user for the building, and wherein the monitoring user receives permission to access the condition data from a passive user.

8. The system of claim 7, wherein when the instructions are executed the one or more processors are further configured to:
   receive a selection from the monitoring user of a vendor for assessing the building; and
   send an alert to the passive user regarding the condition data and the vendor.

9. The system of claim 1, wherein when the instructions are executed the one or more processors are further configured to:
   receive a request from a requesting user to access a building profile of one of the plurality of buildings; and
   identify a permission level for the requesting user to access the building profile; and
   grant or deny access to content within the one or more profiles based on the permission level;
   wherein the requesting user is a passive user, a monitoring user, or a vendor user.

10. The system of claim 1, wherein when the instructions are executed the one or more processors are further configured to:
    receive confirmation from a vendor user that a vendor task for the unfavorable condition has been completed; and send an alert to the user that the vendor task for the unfavorable condition has been completed.

11. The system of claim 1, wherein the one or more sensors comprise:
a thermometer, a hygrometer, a gas detector, a microphone, a vibration sensor, a current sensor, an ultrasonic sensor, an infrared sensor, a microwave sensor, a photoelectric sensor, a time-of-flight sensor, a float sensor.

12. A method for alerting parties of unfavorable conditions, the method comprising:
receiving, via one or more processing devices, condition data captured by one or more sensors for a plurality of buildings;
storing, via the one or more processing devices, the condition data from the one or more sensors for the plurality of buildings in one or more profiles, wherein the one or more profiles comprise:
a plurality of user profiles; and
a plurality of building profiles;
wherein one or more of the plurality of user profiles are linked to one or more of the plurality of building profiles; and
wherein the condition data for the one or more sensors is stored within a respective building profile for the plurality of buildings;
accessing, via the one or more processing devices, condition thresholds from the one or more profiles for the plurality of buildings;
comparing, via the one or more processing devices, the condition data to the condition thresholds;
identifying, via the one or more processing devices, that the condition data violate at least one of the condition thresholds; and
sending, via the one or more processing devices, an alert of an unfavorable condition in a building to a user on a user computer device in response to identifying that the condition data for a sensor for the building violates the at least one of the condition thresholds, wherein the user is determined from a user profile linked to a building profile for the building.

13. The method of claim 12, wherein the plurality of user profiles, the plurality of building profiles, the condition data, and the condition thresholds are stored in a database, and wherein the database is a relational database or an object database.

14. The method of claim 12, further comprising:
receiving, via the one or more processing devices, a selection of the at least one of the condition thresholds from the user through a user interface.

15. The method of claim 12, wherein the condition thresholds are customized condition thresholds, and wherein the method further comprises:

capturing, via the one or more processing devices, the condition data multiple times between a first time and a second time;
determining, via the one or more processing devices, a customized condition threshold based on an analysis of the condition data captured multiple times between the first time and the second time.

16. The method of claim 12, further comprising:
sending, via the one or more processing devices, an alert of the unfavorable condition and the condition data to a vendor responsible for assessing the building.

17. The method of claim 12, wherein the user is a passive user for the building or a monitoring user for the building, and wherein the monitoring user receives permission to access the condition data from the passive user.

18. A computer program product for alerting parties of unfavorable conditions, the computer program product comprising at least one non-transitory computer-readable medium having computer-readable program instructions portions embodied therein, the computer-readable program instruction portions comprising:
instructions configured to receive condition data captured by one or more sensors for a plurality of buildings;
instructions configured to store the condition data from the one or more sensors for the plurality of buildings in one or more profiles, wherein the one or more profiles comprise:
a plurality of user profiles; and
a plurality of building profiles;
wherein one or more of the plurality of user profiles are linked to one or more of the plurality of building profiles; and
wherein the condition data for the one or more sensors is stored within a respective building profile for the plurality of buildings;
instructions configured to access condition thresholds from the one or more profiles for the plurality of buildings;
instructions configured to compare the condition data to the condition thresholds;
instructions configured to identify that the condition data violates at least one of the condition thresholds; and
instructions configured to send an alert of an unfavorable condition in a building to a user on a user computer device in response to identifying that the condition data for a sensor for the building violates the at least one of the condition thresholds, wherein the user is determined from a user profile linked to a building profile for the building.

* * * * *